Aug. 15, 1933.   A. H. DE ROME   1,922,795
APPARATUS FOR BRINE FREEZING AND ICING OR GLAZING EDIBLES
Original Filed Jan. 2, 1931
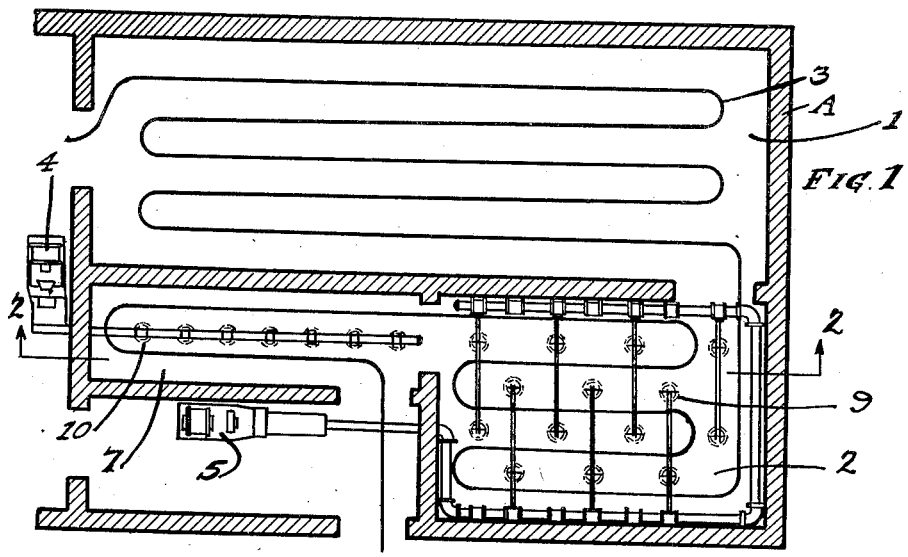
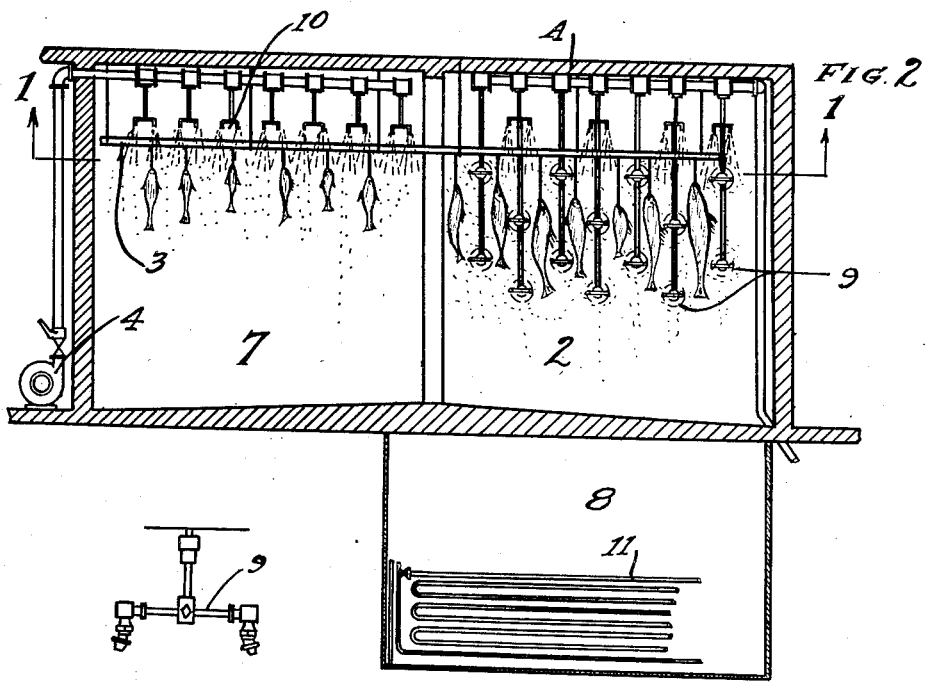
INVENTOR:
A. H. DeRome
per
CLUFFE & RICHARD
Attys.

Patented Aug. 15, 1933

1,922,795

UNITED STATES PATENT OFFICE 1,922,795

APPARATUS FOR BRINE FREEZING AND ICING OR GLAZING EDIBLES

Andre H. De Rome, Quebec City, Quebec, Canada

Application January 2, 1931, Serial No. 506,154, and in Canada January 27, 1930. Renewed February 9, 1933

3 Claims. (Cl. 62—104)

My invention relates to improvements in an apparatus for freezing and icing or glazing fish, meat, vegetables and other like commodities, and the objects of my invention are to eliminate, as far as possible, the handling of the commodities being treated, to prevent impairing the flavour of the commodities during freezing, to permit of a uniform glazing of commodities, etc., and to prevent deterioration of the same.

The commodities being treated are first passed through a sharp freezer to prevent the subsequent freezing solution from penetrating the skin and flesh and affecting the flavour of the commodity, and subsequently the commodity is passed through a zone of vaporized fresh cooled water when the commodity is then washed and iced.

By the use of my apparatus, I am able to save sixteen handlings so that the treatment may be carried on continuously and with greater output of the apparatus thereby increasing the efficiency thereof.

With the above and other objects in view, the invention consists of the apparatus which I have disclosed in detail in my appended claims.

So that the nature of my invention will be clearly understood, I have illustrated a preferred embodiment of an apparatus which I use, and I wish it to be understood that I do not limit myself to that particular construction but reserve the right to modify the same within the scope of my appended claims.

In the drawing:—

Fig. 1 is a sectional plan view, looking up, of my improved apparatus, on the line 1—1, of Fig. 2.

Fig. 2 is a cross section of the same, on the line 2—2 of Fig. 1.

Fig. 3 is a side elevation of a sprinkler.

Like characters of reference refer to like parts in the several figures;

Referring to the drawing, A represents my improved apparatus comprising a sharp freezer 1 communicating with a brine freezing room 2 which in turn communicates with an icing room 7.

The fish or other commodity being treated is passed at a predetermined rate through the sharp freezer, brine freezing room and icing room and to facilitate carrying out this process and rendering the same continuous, I provide a conveyor 3 which will operate on a tortuous path to maintain the commodity the desired length of time in the several chambers or rooms through which it passes.

In the brine freezing room 2, I provide a plurality of rotary sprayers or sprinklers on the ceiling and side walls of the room and these sprayers or sprinklers atomize the brine passing therethrough so that the room is filled with a mist of cold freezing fluid.

The brine is pumped from the brine tank 8 by a pump 5 and delivered to the rotary sprayers 9.

The brine tank is fitted with a cooling coil 11 through which is circulated in a suitable manner a freezing solution such as I have described in my Canadian Patent No. 293,095, dated 17th of September, 1929, and United States application No. 455,972, filed the 26th of May, 1930.

The icing room 7 is provided with rotary sprayers or sprinklers 10 through which cold water is delivered from the pump 4.

This water is fresh and on passing through the rotary sprayers it is atomized so that there is a mist of cold fluid in the icing room.

When my apparatus is in use, the commodity being treated (such as fish) is hung on the conveyor 3 and passes through the sharp freezer 1 where the skin of the fish is frozen and prevents the penetration into the flesh of the fish of the subsequent brine freezing fluid with which the fish is hereafter treated.

The fish is now carried by the conveyor into the brine freezing room 2 and this atmosphere of brine quickly freezes the fish and covers it with a coating of any desired thickness, after which the conveyor carries the fish into the icing room 7 where the atmosphere of fresh water washes any excess of brine freezing solution from the fish which are now submitted to a mist of fresh water which leaves it with a glazed surface impervious to the air.

The depth of the glaze coating on the fish can be regulated to the desired extent and the fish are thus hermetically sealed in an envelope of ice and will thus keep for an indefinite period.

The fish now pass through a storage room ready for shipment.

Although I have described the apparatus in connection with the freezing of fish, the same is applicable to vegetables, fruits and like commodities and when frozen by this process these products will retain their flavour and appearance and can be kept for an indefinite period without being impaired in quality and wholesomeness.

What I claim as my invention is:

1. An apparatus of the class described comprising a sharp freezer, a brine freezing room communicating therewith, means for maintaining an atmosphere of cool fluid in the freezing room, an icing room communicating with the brine freezing room, and means for conveying the commodities being treated through the apparatus at a predetermined rate.

2. An apparatus of the class described comprising a sharp freezer, a brine freezing room communicating therewith, means for maintaining an atmosphere of vaporized cooled brine fluid in the said room, an icing and washing room communicating with the said room, means for maintaining an atmosphere of fresh cold water in the last said room, and means for conveying the commodities being treated through the apparatus at a predetermined speed.

3. The apparatus claimed in claim 2 in which rotary sprayers are used in the freezing and icing room to maintain the required atmosphere therein.

A. H. DE ROME.